US010023153B2

(12) United States Patent
Jomard et al.

(10) Patent No.: US 10,023,153 B2
(45) Date of Patent: Jul. 17, 2018

(54) END FITTING PROVIDED IN ORDER TO BE MOUNTED ON A FLEXIBLE SUPPORT AND WIPER BLADE COMPRISING THE END FITTING AND THE FLEXIBLE SUPPORT

(71) Applicant: Valeo Systèmes d'Essuyage, Le Mesnil Saint Denis (FR)

(72) Inventors: Olivier Jomard, Aubiere (FR); Eric Poton, Pont du Chateau (FR); Vincent Gaucher, Ennezat (FR); Stéphane Houssat, Blanzat (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 77 days.

(21) Appl. No.: 15/196,154

(22) Filed: Jun. 29, 2016

(65) Prior Publication Data
US 2016/0375868 A1    Dec. 29, 2016

(30) Foreign Application Priority Data

Jun. 29, 2015    (FR) ..................... 15 56029

(51) Int. Cl.
*B60S 1/38* (2006.01)

(52) U.S. Cl.
CPC ............. *B60S 1/3891* (2013.01); *B60S 1/381* (2013.01); *B60S 1/3851* (2013.01); *B60S 1/3886* (2013.01); *B60S 1/3887* (2013.01); *B60S 1/3894* (2013.01)

(58) Field of Classification Search
CPC .... B60S 1/3891; B60S 1/3886; B60S 1/3887; B60S 1/3894; B60S 1/3889; B60S 1/3893; B60S 1/3896
See application file for complete search history.

(56) References Cited

U.S. PATENT DOCUMENTS

| 2008/0289134 A1* | 11/2008 | Boussicot | ............... B60S 1/381 15/250.32 |
| 2010/0064468 A1* | 3/2010 | Kang | .................... B60S 1/3889 15/250.48 |
| 2011/0107543 A1* | 5/2011 | Boland | ................. B60S 1/3887 15/250.31 |

(Continued)

FOREIGN PATENT DOCUMENTS

| CN | 101797914 A | 8/2010 |
| CN | 103596816 A | 2/2014 |

(Continued)

OTHER PUBLICATIONS

Preliminary Report and Written Opinion Issued in Corresponding French Application No. 1556029, Dated Apr. 21, 2016 (6 Pages).

(Continued)

*Primary Examiner* — Andrew A Horton
(74) *Attorney, Agent, or Firm* — Osha Liang LLP

(57) ABSTRACT

The invention relates to an end fitting (1) for a wiper blade (2) of a pane of glass of a motor vehicle comprising at least one flexible support (3) and also a squeegee blade (4) designed to be applied against the pane of glass. The end fitting (1) comprises a housing (8) capable of receiving a terminal part of the flexible support (3). The end fitting (1) comprises two distinct elements (5, 6) including an external shell (5) and an internal liner (6) that is provided with the housing (8).

15 Claims, 3 Drawing Sheets

(56) References Cited

U.S. PATENT DOCUMENTS

2014/0090200 A1* 4/2014 Espinasse ............ B60S 1/3891
15/250.361
2014/0259506 A1 9/2014 Op't Roodt et al.

FOREIGN PATENT DOCUMENTS

| FR | 2943020 B1 | 4/2011 |
| FR | 2964618 A1 | 3/2012 |
| WO | 2015069925 A1 | 5/2015 |

OTHER PUBLICATIONS

The First Office Action issued in corresponding Chinese Patent Application No. 201610735284.8, dated Mar. 14, 2018 (13 pages).

* cited by examiner

END FITTING PROVIDED IN ORDER TO BE MOUNTED ON A FLEXIBLE SUPPORT AND WIPER BLADE COMPRISING THE END FITTING AND THE FLEXIBLE SUPPORT

BACKGROUND

The field of the present invention is that of wiper blades designed to equip a motor vehicle, More particularly, the invention relates to an end fitting provided in order to be mounted on a flexible support, the end fitting and the flexible support constituting a wiper blade. The invention also relates to said wiper blade and a wiping system incorporating a wiper blade of this type. The invention also relates to an assembly method of the wiper blade.

A motor vehicle is currently equipped with a wiper system for wiping and washing a windscreen of the motor vehicle in order to prevent the motor vehicle driver's view of his environment being disrupted. The wiper system is conventionally driven by an arm performing an angular back-and-forth movement relative to the windscreen and within a field of view of the driver. The wiper system comprises at least one elongate wiper blade that itself carries a squeegee blade produced from a flexible material. The squeegee blade rubs against the windscreen and evacuates the water by removing it from the driver's field of view. The wiper blade is produced in the form either, in a conventional version, of an articulated whippletree which holds the squeegee blade at a number of discrete locations or, in a more recent version, known as the 'flat blade' version, of a semi-rigid assembly which holds the squeegee blade along its entire length. In this second solution, the semi-rigid assembly is attached to an arm that comprises the wiper system via an assembly constituted by a mechanical connector and an adapter. The mechanical connector is a piece that is crimped directly onto the wiper blade, whilst the adapter is an intermediate piece that allows the fastening of the connector onto the arm of the wiper system.

Document FR 296461 proposes a wiper system of the second type, of which the semi-rigid assembly comprises a flexible support and an end fitting that are secured via a locking means of the end fitting.

The flexible support comprises an air deflector that is shaped in order to convert a pressure exerted by a stream of air flowing along the windscreen into a bearing force of the squeegee blade against said windscreen. The deflector comprises, in particular, a generally convex ridge in order to facilitate a flow of the stream of air.

The flexible support also comprises two channels for conveying a liquid, such as a windscreen washer liquid, which are provided on either side of a holding zone of the squeegee blade.

The flexible support is chosen from a range of flexible supports of varied dimensions and of different shapes not only in terms of their height and width but also in terms of their symmetry. As a result, there is a need for a range of end fittings that is as vast as the range of flexible supports so that it is possible to fix the end fitting onto the flexible support. The use of a wiper blade according to document FR2964618 gives rise to costs of manufacture, referencing and storage that are considerable and that it is desirable to reduce.

Furthermore, it is desirable to have available a wiper blade that cannot be dismantled in the sense that detachment of the end fitting from the flexible support by an ill-intentioned user gives rise to destruction either of the end fitting or of the flexible support, or both. The result of the aforesaid is that the end fitting proposed by document FR2964618 ought to be improved.

SUMMARY OF DISCLOSURE

An object of the present invention is to resolve the drawbacks described above by proposing a robust end fitting arranged in order to withstand severe use conditions and, in particular, sudden actuation of the end fitting, this latter being, furthermore, easy to implement. The end fitting thus designed enhances a level of security and/or of reliability of the fastening of the locking means relative to the flexible support constituting a wiper blade of the present invention, which is capable of withstanding deliberate damage by a user or damage caused by a clumsy passerby.

A further object of the present invention is to propose an end fitting that is compatible with a flexible support capable of comprising a variety of distinct air deflectors, without adversely affecting the efficiency and/or appearance of the end fitting.

An end fitting of the present invention is an end fitting for a wiper blade of a pane of glass of a motor vehicle comprising at least one flexible support and also a squeegee blade designed to be applied against the pane of glass. The end fitting comprises a housing capable of receiving a terminal part of the flexible support.

According to the present invention, the end fitting comprises two distinct elements including an external shell and an internal liner that is provided with the housing.

In the position of use of the wiper blade, the external shell advantageously accommodates the internal liner.

The end fitting is preferably provided with at least a first locking means of the internal liner inside the external shell.

The first locking means is, in particular, a nesting locking means.

The first locking means comprises, for example, at least one stud and at least one groove capable of receiving at least in part the stud in the position of use of the wiper blade.

Preferably, the stud equips a first internal face of the external shell and the groove equips a first external face of the internal liner.

The first locking means comprises, for example, at least two antagonistic stops, including at least a first stop equipping a second internal face of the external shell and at least a second stop equipping a second external face of the internal liner.

The first stop and the second stop advantageously extend inside a transverse plane that is orthogonal to a longitudinal axis of elongation of the end fitting.

Preferably, the first internal face and the second internal face of the external shell delimit in part an enclosure for receiving the internal liner.

The enclosure preferably accommodates at least one guide ramp of the internal liner.

The guide ramp is, for example, carded by a reinforcement, the guide ramp being provided in a longitudinal plane.

A wiper blade of the present invention comprises at least one fitting of this type and said flexible support inserted inside the housing.

The wiper blade advantageously comprises at least a second locking means of the terminal part of the flexible support in the engaged position inside the housing.

A wiper system of the present invention comprises a wiper blade of this type and a driving arm of said wiper blade.

An assembly method of a wiper blade of this type is principally noteworthy in that the assembly method comprises a first step of insertion of the internal liner inside the external shell based on a translational displacement of the internal liner and the external shell relative to one another.

The assembly method comprises, in particular, a second step of engaging the internal liner between the first internal face and the second internal face of the external shell, the second step of engagement also comprising a step of at least partial positioning of the stud of the external shell inside the groove of the internal liner.

The assembly method comprises, in particular, a third locking step of the end fitting on the flexible support.

These arrangements are such that the end fitting advantageously cannot be dismantled in the sense that the association of the external shell and of the internal liner is robust and permanent under said severe but everyday use conditions of the wiper blade and such that an association of this type cannot be broken other than by destroying the end fitting.

These arrangements are also such that the end fitting is constituted from a standard internal liner and an external shell chosen from a range of external shells harmonised with elements of the flexible support, such as the air deflector or the flexible support itself.

According to other advantageous features of the invention, taken alone or in combination with one another and/or the above features:

said external shell is substantially harmonised with a connection means of the wiper blade to a driving arm of said blade. 'Harmonised' is understood to mean that the external shell is, in aesthetic and/or aerodynamic terms, continuous with said connection means, This aesthetic and/or aerodynamic continuity does not exclude the presence of a narrow gap between the external shell and the connection means.

said external shell extends substantially from a longitudinal end of the wiper blade as far as a connection means of the blade to a driving arm of the blade, said connection means being attached to the flexible support of the blade, substantially at the centre, longitudinally, of the wiper blade.

said external shell is articulated on a connection means of the blade to a driving arm of the blade.

said external shell is an end cap of the wiper blade, which is preferably a flat blade. The external shell thus forms a fairing of the blade capable of fulfilling a function of deflecting air beyond the region of the internal liner, along a direction towards the longitudinal centre of the blade.

Further features, details and advantages of the invention will become more clearly apparent from reading the description given below by way of illustration and with reference to the drawings

DETAILED DESCRIPTION

It should first of all be noted that the figures explain the present invention in detail for implementing the invention, it being, of course, possible for said figures to serve to better define the invention if necessary.

In the figures, the term "longitudinal" refers to the orientation of an end fitting 1 or of a wiper blade 2 according to the invention. The longitudinal direction corresponds to a general longitudinal axis A1 of elongation of the wiper blade 2, whilst a transverse orientation corresponds to a concurrent direction, that is to say a direction intersecting the longitudinal direction which is, in particular, perpendicular to the general longitudinal axis A1 of elongation of the wiper blade 2.

Figure 1:
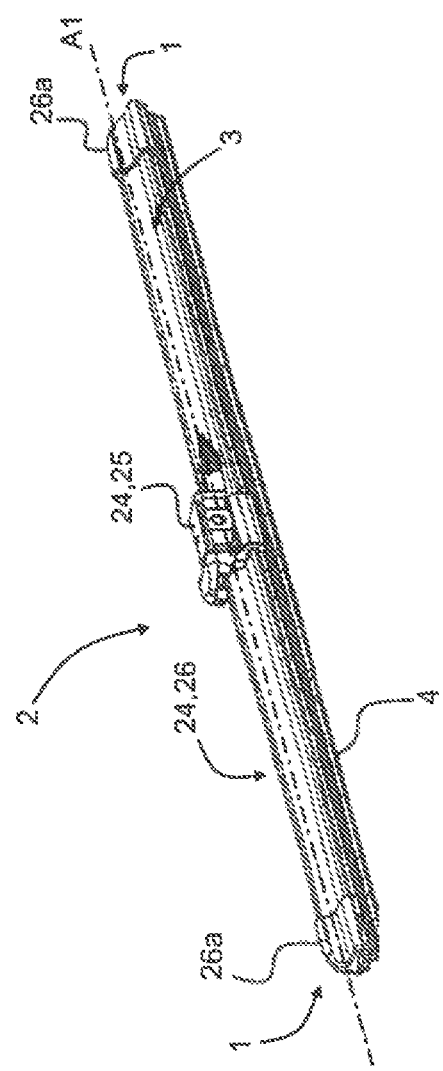
FIG. 1 is a general perspective view of a wiper blade according to the present invention which is provided in order to be mounted on a windscreen of a motor vehicle.

In FIG. 1, the wiper blade 2 of the present invention is represented in perspective. A wiper blade 2 of this type is used to perform a squeegee action on a pane of glass of a motor vehicle. Preferably, the pane of glass is a windscreen equipping a passenger compartment of the motor vehicle. Alternatively, the pane of glass is a rear screen of the motor vehicle. In the above case, the wiper blade 2 has the function of displacing water and/or soiling deposited on the pane of glass outside of a field of illumination. According to another example, the pane of glass is, for example, a pane of glass of a headlamp equipping the motor vehicle. In the above case, the wiper blade 2 has the function of displacing water and/or soiling deposited on the pane of glass outside of a field of illumination.

The wiper blade 2 is constituted from at least one flexible support 3, a component 24, a squeegee blade 4 and at least one end fitting 1, and even, preferably, two end fittings 1 installed on each terminal part of the flexible support 3.

The flexible support 3 may have the form of a single flat, flexible metal strip. According to an alternative, the flexible support 3 may be formed by two flexible metal strips each accommodated in a notch provided on either side of the squeegee blade 4. In the above two cases, when at rest, a metal strip of this type is curved in accordance with a plane perpendicular to a longitudinal direction of the metal strip. The function of a metal strip of this type, whether it is a single or a double strip, is to distribute the bearing forces along the squeegee blade 4 that are generated by a connection means 25 attached to the flexible support 3 at the centre, longitudinally, of the wiper blade 2.

The component 24 denotes several types of piece constituting the wiper blade 2. This may be the connection means 25 designed to connect the wiper blade 2 to a rotational driving arm of the wiper blade 2. This may also be one or more air deflectors 26 attached to the flexible support 3, the function of which is to convert a stream of air passing over the wiper blade 2 into a bearing force that presses the squeegee blade 4 against the pane of glass.

The end fitting 1 comprises an upper wall 26a that extends the air deflector 26. The upper wall 26a is a wall that is visible from en observation point of the motor vehicle located in front thereof.

Figure 2:
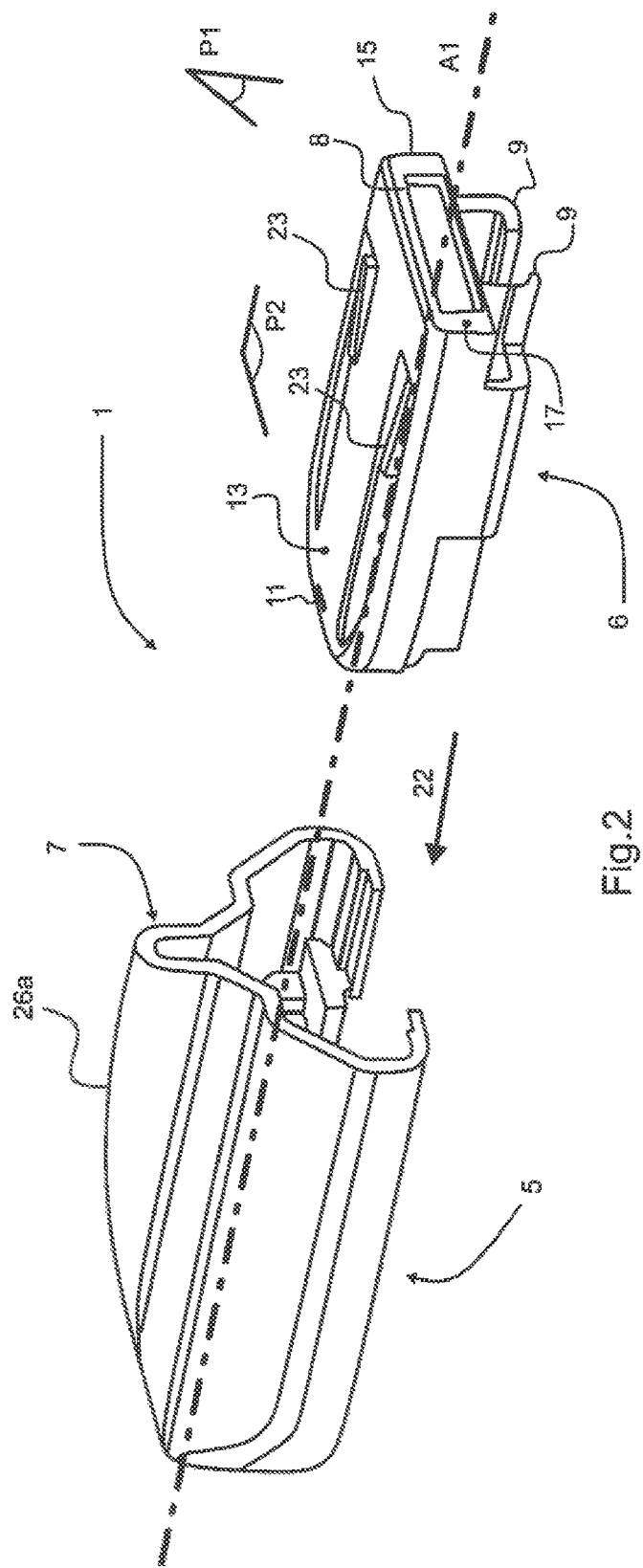
FIG. 2 is a side perspective view of an external shell and of an internal liner constituting an end fitting included in the wiper blade illustrated in FIG. 1, FIG. 2 being produced at the time of a phase prior to a step of assembly of the external shell and of the internal liner in order to form the end fitting.

In FIG. 2, the end fitting comprises two distinct elements 5, 6 including an external shell 5 and en internal finer 6. In other words, and contrary to common practice in the automotive field, the end fitting 1 is formed from two distinct elements 5, 6 that are separate prior to a step of assembling the distinct elements 5, 6 together. Once again, in other words the end fitting 1 does not form a monobloc assembly prior to said step.

According to a preferred variant, the end fitting 1 is as a result constituted from the external shell 5 and the internal liner 6, which are assembled in order to form the end fitting 1 in the use position of the wiper blade 2 illustrated in FIG. 2.

Figure 4:
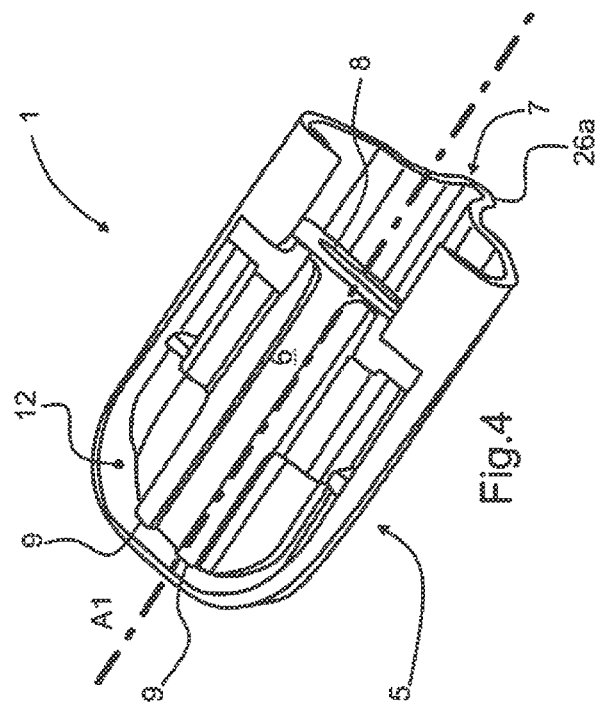
FIG. 4 is a bottom perspective view of the end fitting illustrated in FIG. 2, FIG. 4 being produced after the step of assembly of the external shell and of the internal liner in order to form the end fitting.

In this position, also shown in FIG. 4, the external shell 5 accommodates the internal liner 6. In other words, the external shell 5 forms an envelope of the internal liner 6, which is invisible to an observer viewing the end fitting 1 from above the upper we 26a, i.e. from a normal point of observation of the wiper blade 2 in the position of use on the motor vehicle. Once again, in other words the external shell 5 forms a receptacle for receiving the internal liner 6 and forms a cover for said user.

The external shell 5 is chosen from a range of external shells 5 adapted to varied forms and dimensions of the air deflector 26. To that end, the external shell 5 comprises a ridge 7 that is adapted to a shape of the air deflector 26, not only in terms of the height and width but also of the symmetry of the latter. The ridge 7 is, in particular, a continuation of the air deflector 26. These arrangements are such that the external shell 5 has an aesthetic function in order to harmonise a shape of the flexible support 3 equipped with the air deflector 26 and to provide said observer with a homogeneous view of the wiper blade 2.

The internal liner 6 has the function of forming the assembly between the end fitting 1 and the flexible support 3. The flexible support 3 preferably being of a constant shape, the internal liner 6 is standardised. In other words, two end fittings 1 of the present invention can be produced by the assembly of one and the same identical internal liner 6 in each of the end fittings 1 together with different external shells 5 in each of the end fittings 1.

More particularly, the internal liner 6 comprises a housing 8 capable of receiving the terminal part of the flexible support 3. The housing 8 is shaped as a slide inside which the terminal end of the flexible support 3 is able to slide at the time of the step of assembling the end fitting 1 onto the flexible support 3. The housing 8 is extended in accordance with the general longitudinal axis A1 of elongation of the wiper blade 2, which also forms a general axis of elongation of the internal liner 6.

More particularly, still, the internal liner 6 comprises holding tabs 9 of a terminal end of the squeegee blade 4, the holding tabs 9 being two in number and provided parallel to one another and parallel to the general longitudinal axis A1 of elongation of the wiper blade 2.

Figure 3:
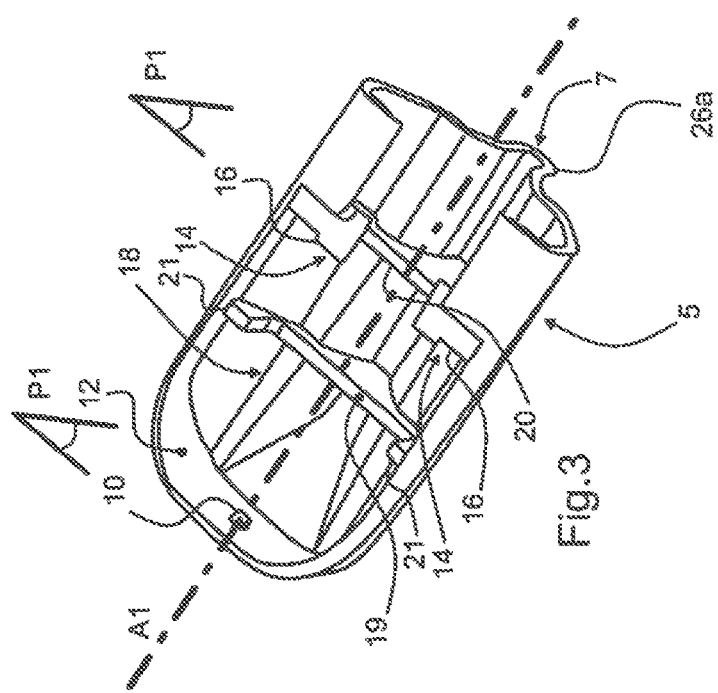
FIG. 3 is a bottom perspective view of the external shell illustrated in FIG. 2.

The end fitting 1 is provided with at least a first locking means 10, 11, 14, 15 of the internal liner 6 inside the external shell 5. The first locking means 10, 11, 14, 15 cannot be dismantled in the sense that the internal liner 6 cannot be detached from the external shell 5 until after damage has occurred to the internal liner 6 or to the external shell 5, or both. The first locking means 10, 11, 14, 15 is preferably a nesting locking means that comprises at least one stud 10, visible in FIG. 3, and at least one groove 11, visible in FIG. 2, capable of receiving the stud 10 in the use position of the wiper blade 2. In this position, the stud 10 is accommodated at least in part inside the groove 11, such that the stud 10 is unable to leave the groove 11 until after breakage of the stud 10, tearing of the groove 11, or both. The stud 10 equips a first internal face 12 of the external shell 5 and the groove 11 equips a first external face 13 of the internal liner 6.

The first locking means 10, 11 14, 15 comprises at least two antagonistic stops 14, 15, including at least a first stop 14 equipping a second internal face 16 of the external shell 5 and at least a second stop 15 equipping a second external face 17 of the internal liner 6.

The first internal face 12 and the second internal face 16 of the external shell 5 are advantageously provided facing one another parallel to a transverse plane P1 that is preferably orthogonal to the general longitudinal axis A1 of elongation of the wiper blade 2.

The first external face 13 and the second external face 17 are, in particular, perpendicular to one another, the second external face 17 being provided parallel to the transverse plane P1. The transverse plane P1 is orthogonal to a longitudinal plane P2 that comprises the general longitudinal axis A1 of elongation of the wiper blade 2.

In the assembled position of the external shell 5 and internal liner 6, the first stop 14 and the second stop 15 are in contact with one another, and even pressed against one another forcibly in order to ensure nesting of the internal liner 6 inside the external shell 5. In this position, the first internal face 12 and the second internal face 16 of the external shell 5 delimit in part an enclosure 18 for receiving the internal liner 6.

The enclosure 18 is provided with at least one guide ramp 19 of the internal liner 6 upon insertion of the latter inside the external shell 5. The guide ramp 19 is preferably provided parallel to the longitudinal plane P2 by being carried by a reinforcement 20 provided in accordance with the transverse plane P1. The reinforcement 20 is preferably provided with at least one guide finger 21 of the internal liner 6, which is provided at the ends of the guide ramp 19 in order to border at least in part the internal liner 6 upon insertion of the latter inside the external shell.

The guide ramp 19 is provided in order to guide, in translation, the first external face 13 of the internal liner 6 until the stud 10 is inserted in the groove 11 and the first stop 14 and the second stop 15 are in contact with one another, the internal liner 6 then being engaged between the first internal face 12 and the second internal face 16 of the external shell 6, as illustrated in FIG. 4. To facilitate the insertion of the internal liner 6 inside the external shell 5, the external face 13 is provided with at least one hook 23 that extends in accordance with the general longitudinal axis A1 of elongation of the wiper blade 2.

An assembly method of a wiper blade 2 of this type comprises a first step of insertion of the internal liner 6 inside the external shell 5 based on a translational displacement 22 of the internal liner 6 and the external shell 5 relative to one another, as illustrated in FIG. 2.

Next, the assembly method comprises a second step of engaging the internal liner 6 between the first internal face 12 and the second internal face 16 of the external shell 5. The second step of engagement comprises, also, a step of at least partial positioning of the stud 10 of the external shell 5 inside the groove 11 of the internal liner 6, as illustrated in FIG. 4.

Lastly, the assembly method comprises a third locking step of the end fitting 1 on the flexible support 3.

What is claimed is:
1. A wiper blade of a pane of glass of a motor vehicle comprising:
  at least one flexible support;
  a squeegee blade to be applied against the pane of glass; and
  at least one end fitting, comprising:

two distinct elements including an external shell and an internal liner that is provided with a housing and holding tabs, wherein the housing is configured to receive a terminal part of the at least one flexible support and the holding tabs are configured to receive a terminal part of the squeegee blade, wherein the external shell includes a first internal face and a second internal face, wherein the internal liner includes a first external face and a second external face, and the internal liner is attached to the external shell such that the internal liner cannot be detached from the external shell until after damage has occurred to the internal liner and/or to the external shell.

2. The wiper blade according to claim 1, wherein the end fitting is provided with at least a first locking means of the internal liner inside the external shell.

3. The wiper blade according to claim 2, wherein the first locking means is a nesting locking means.

4. The wiper blade according to claim 3, wherein the first locking means comprises at least one stud and at least one groove for receiving at least in part the stud in the position of use of the wiper blade.

5. The wiper blade according to claim 4, wherein the stud equips the first internal face of the external shell and the groove equips the first external face of the internal liner.

6. The wiper blade according to claim 5, wherein the first internal face and the second internal face of the external shell delimit in part an enclosure for receiving the internal liner.

7. The wiper blade according to claim 6, wherein the enclosure accommodates at least one guide ramp of the internal liner.

8. The wiper blade according to claim 7, wherein the guide ramp is carried by a reinforcement, the guide ramp being provided in a longitudinal plane.

9. The wiper blade according to claim 2, wherein the first locking means comprises at least two antagonistic stops, including at least a first stop equipping the second internal face of the external shell and at least a second stop equipping the second external face of the internal liner.

10. The wiper blade according to claim 9, wherein the first stop and the second stop extend inside a transverse plane that is orthogonal to a longitudinal axis of elongation of the end fitting.

11. The wiper blade according to claim 1, wherein said at least one flexible support is inserted inside the housing.

12. A wiper system comprising the wiper blade according to claim 11; and a driving arm of said wiper blade.

13. An assembly method of the wiper blade according to claim 11, comprising:
inserting the internal liner inside the external shell based on a translational displacement of the internal liner and the external shell relative to one another.

14. The assembly method of the wiper blade according to claim 13, further comprising:
engaging the internal liner between the first internal face and the second internal face of the external shell; and
at least partial positioning of a stud of the external shell inside a groove of the internal liner.

15. The assembly method of a wiper blade according to claim 14, further comprising locking the end fitting on the at least one flexible support.

* * * * *